July 29, 1947.                J. J. SOBIRAI                2,424,639
                                BICYCLE
                        Filed June 5, 1945            2 Sheets-Sheet 1
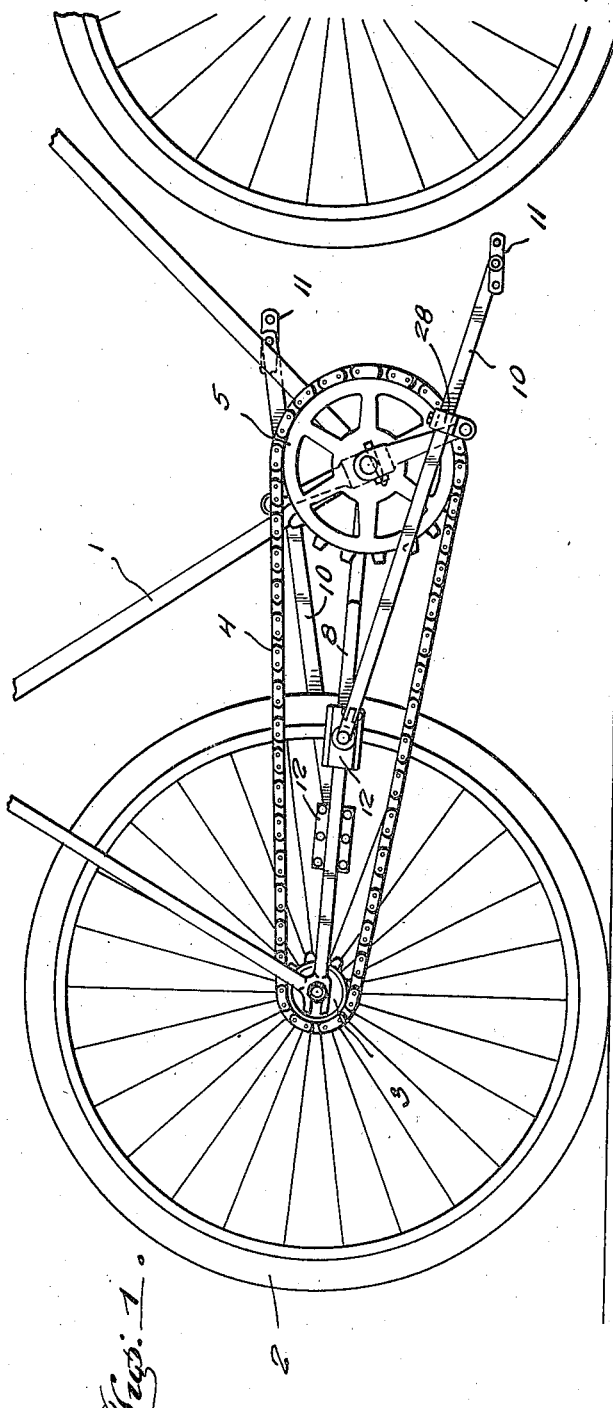
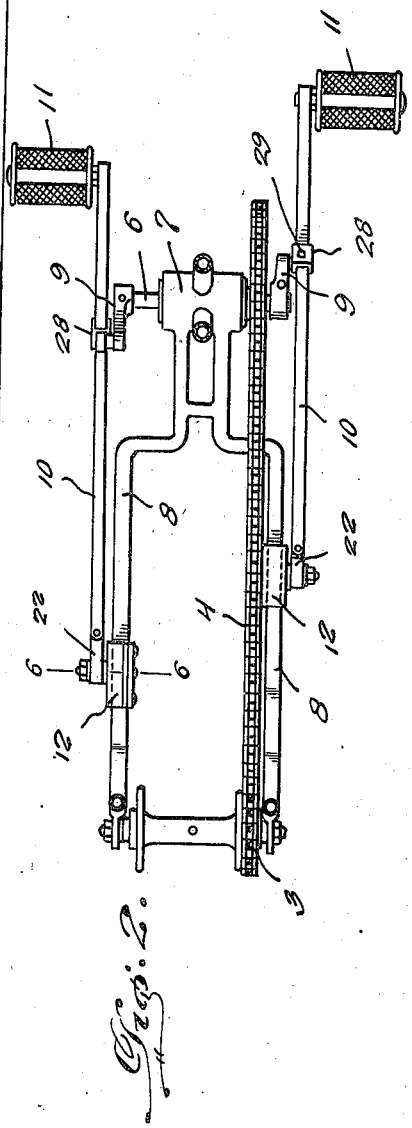
Inventor
Joseph J. Sobirai,
By McMorrow, Berman & Davidson
                              Attorneys

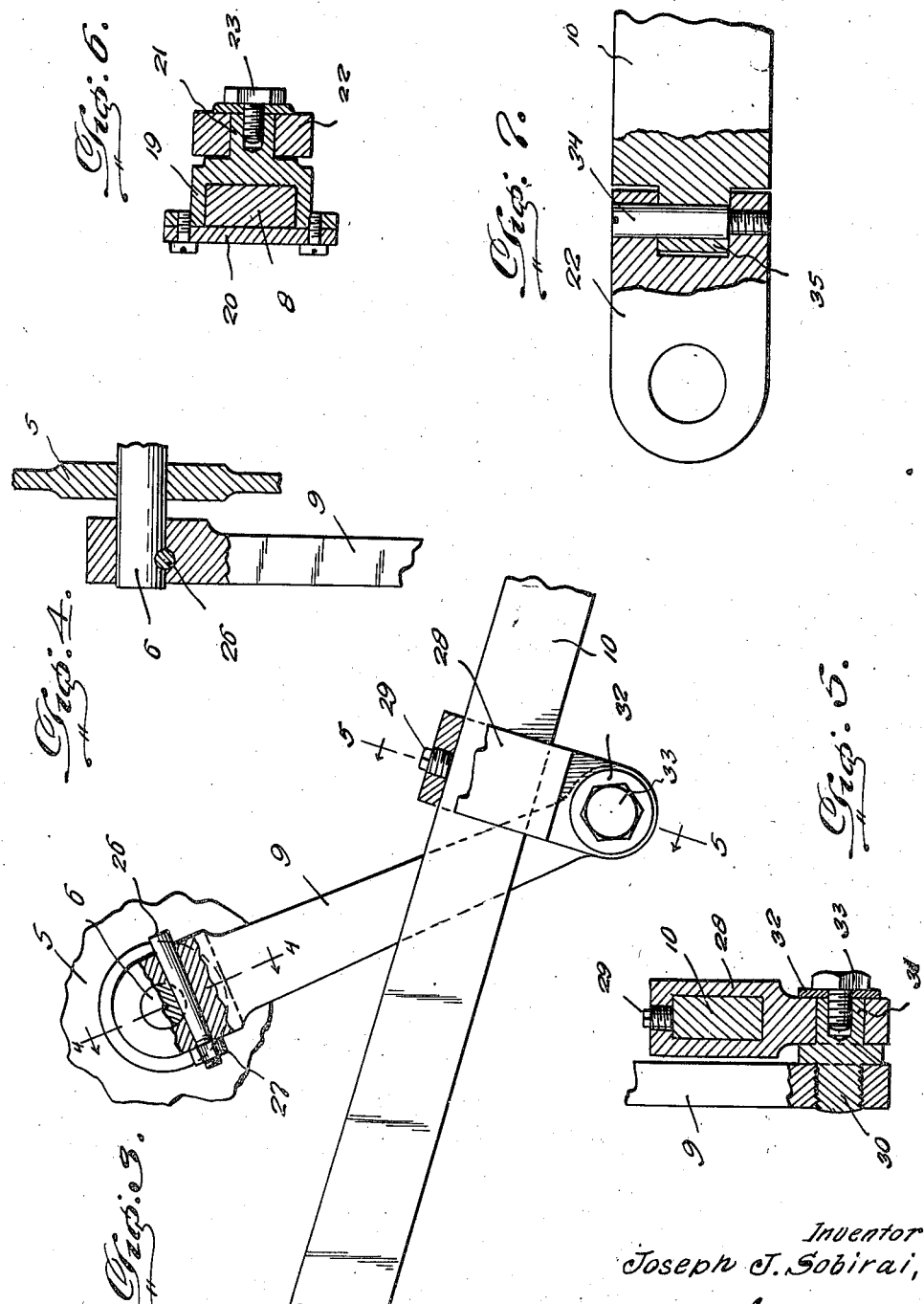

Patented July 29, 1947

2,424,639

UNITED STATES PATENT OFFICE 2,424,639

BICYCLE

Joseph J. Sobirai, Hartford, Conn.

Application June 5, 1945, Serial No. 597,631

1 Claim. (Cl. 280—257)

This invention relates to bicycles, and more particularly, to power transmitting mechanisms for bicycles.

A main object of the invention is to provide a new and improved power transmitting mechanism for a bicycle.

A further object of the invention is to provide an improved power transmitting mechanism for a bicycle wherein a greater leverage and a longer power stroke may be obtained for propelling the bicycle.

Further objects and advantages of the invention will appear from the following description and claim, and from the accompanying drawings, wherein:

Figure 1 is a side elevational view of a bicycle constructed in accordance with this invention.

Figure 2 is a detail plan view of the power transmitting mechanism of the bicycle of Figure 1.

Figure 3 is a detail view showing the connections of portions of the power transmitting elements of the bicycle of Figure 1.

Figure 4 is a cross sectional view taken on line 4—4 of Figure 3.

Figure 5 is a cross-sectional view taken on line 5—5 of Figure 3.

Figure 6 is a detail cross-sectional view taken on line 6—6 of Figure 2.

Figure 7 is a detail view showing a pivoted connection employed for connecting the drive arm to the frame of the bicycle in accordance with this invention.

Referring to the drawings, 1 designates a bicycle frame provided with a rear drive wheel 2 journaled at the rear portion of the frame. Secured to wheel 2 is a driven sprocket wheel 3 which is actuated by a chain 4 driven by a driving sprocket wheel 5. Sprocket wheel 5 is mounted on a shaft 6 journaled in a bearing section 7 of frame 1, said bearing section 7 being connected by a pair of rearwardly extending frame elements 8, 8 to the axle of rear wheel 2.

Rigidly connected to the end portions of shaft 6 are crank arms 9, 9, the rigid connection being achieved by passing a tapered pin 26 through the end portion of each crank arm 9, said tapered pin engaging shaft 6 in an appropriate groove formed therein to lock shaft 6 with respect to crank arm 9. The tapered pin 26 is externally threaded and is secured in locking position by a nut 27.

Each crank arm 9 is pivotally secured to a respective drive arm 10 at an intermediate point on said arm. Each arm 10 carries at its forward end a pivotally mounted pedal 11 and at its rearward end a pivotally mounted slider 12, the sliders 12 respectively embracing the frame elements 8, 8 for free longitudinal movement thereon.

It can be readily seen that the driving force acting on sprocket wheel 5 is multiplied as over the usual pedal mounting arrangement by the employment of the long driving arms 10. By the use of said long driving arms the length of the power stroke of the pedal is increased so that rapid acceleration may be obtained when desired, and the accelerating force is applied in a smooth even manner rather than in short spurts.

For adjusting the length of the power stroke in accordance with individual riders, the pivotal connection of crank 9 to driving arm 10 is made through a longitudinally adjustable bearing bracket 28 embracing arm 10 and secured in desired adjusted position by a set screw 29. As shown in Figures 3 and 5, a stud bolt 30 is threadedly secured to crank 9, said stud bolt being formed with a stub shaft portion 31 pivotally received in bracket 28 and secured thereto by a washer member 32 which in turn is held in position on the end of stub shaft 31 by a bolt 33.

Slider 12 comprises a channel-shaped body portion 19 adapted to slidably embrace frame element 8, said body portion 19 being secured against separation from said frame element 8 by a plate member 20. Body portion 19 carries an outwardly projecting stud member 21 adapted to be pivotally engaged by a bearing element 22 which is connected to the rearward end of driving arm 10. Stud member is held against separation from bearing element 22 by a bolt 23 threaded into the end of stud member 21, an appropriate washer being provided under the head of bolt 23.

The connection of bearing element 22 to the rearward end of driving arm 10 is made, as shown in Figure 7, by providing a hinge connection, a bearing pin 34 being employed to form the hinge. Bearing element 22 is formed with a recess which receives a tongue element 35, formed at the end of driving arm 10, pin 34 passing through the recessed portion and tongue element 35 and being threadedly secured in position. Clearance is provided to allow the necessary amount of lateral pivoting of drive arm 10 with respect to bearing element 22 which will normally occur during operation of the bicycle driving mechanism.

While a specific embodiment of an improved power transmitting mechanism for a bicycle has been disclosed in the foregoing description, it will be understood that various modifications within the spirit of the invention may occur to those skilled in the art. Therefore, it is intended that no limitations be placed on the invention other than as defined by the scope of the appended claim.

What is claimed is:

A power transmitting mechanism for a bicycle comprising a driving sprocket wheel mounted on a transverse shaft journaled in the frame of the bicycle, a crank rigidly secured to each end of said shaft, the cranks being oppositely directed, a pair of driving arms, each including a front section and a rear section pivoted to each other for horizontal pivotal movement, a sleeve adjustably mounted on said front section of the arm and pivoted to one of the cranks, a pedal pivoted on the front section of each arm, and a slide member mounted on a longitudinal frame member of the bicycle and pivoted to said rear section of the arm.

JOSEPH J. SOBIRAI.

REFERENCES CITED

The following references are of record in the file of this patent:

FOREIGN PATENTS

| Number | Country | Date |
|---|---|---|
| 12,526 | Great Britain | June 8, 1896 |
| 90,023 | Germany | Jan. 4, 1897 |